(12) United States Patent
Lee

(10) Patent No.: US 11,954,041 B2
(45) Date of Patent: Apr. 9, 2024

(54) CONTROLLER INCLUDING MAP CACHE AND MEMORY SYSTEM INCLUDING CONTROLLER

(71) Applicant: SK hynix Inc., Gyeonggi-do (KR)

(72) Inventor: Joung Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 217 days.

(21) Appl. No.: 17/205,398

(22) Filed: Mar. 18, 2021

(65) Prior Publication Data

US 2022/0091993 A1 Mar. 24, 2022

(30) Foreign Application Priority Data

Sep. 18, 2020 (KR) .................. 10-2020-0120336

(51) Int. Cl.
*G06F 12/10* (2016.01)
*G06F 12/0875* (2016.01)
*G06F 16/2455* (2019.01)

(52) U.S. Cl.
CPC .......... *G06F 12/10* (2013.01); *G06F 12/0875* (2013.01); *G06F 16/24558* (2019.01); *G06F 2212/657* (2013.01)

(58) Field of Classification Search
CPC .. G06F 12/10; G06F 12/0802; G06F 12/0873; G06F 12/0848; G06F 12/1045; G06F 12/0875; G06F 2212/7201; G06F 12/0246; G06F 16/24558
USPC .......................................... 711/113, 103, 203
See application file for complete search history.

(56) References Cited

U.S. PATENT DOCUMENTS

| 11,086,524 B1* | 8/2021 | Sun ..................... G06F 3/0604 |
| 2007/0061540 A1* | 3/2007 | Rafert ................. G06F 16/188 |
| | | 711/170 |
| 2012/0221828 A1* | 8/2012 | Fang ..................... G06F 3/0611 |
| | | 711/E12.078 |
| 2015/0347314 A1* | 12/2015 | Lee ..................... G06F 12/1009 |
| | | 711/103 |
| 2018/0107592 A1* | 4/2018 | Hashimoto ........... G06F 3/0659 |

(Continued)

FOREIGN PATENT DOCUMENTS

| CN | 111324557 A | 6/2020 |
| KR | 10-1699779 | 1/2017 |
| KR | 10-2017-0044782 | 4/2017 |

OTHER PUBLICATIONS

Office Action for the Chinese Patent Application No. 202110415706.4 issued by the Chinese Patent Office dated Sep. 25, 2023.

*Primary Examiner* — Yaima Rigol
*Assistant Examiner* — Edward Waddy, Jr.
(74) *Attorney, Agent, or Firm* — IP & T GROUP LLP

(57) ABSTRACT

The present technology includes a controller and a memory system including the same. The controller includes a descriptor manager configured to generate descriptors including logical addresses and physical addresses respectively mapped to the logical addresses, a map cache configured to store the descriptors in a linear structure and a binary tree structure, and a map search engine configured to search for a descriptor corresponding to a logical address received from an external device among the descriptors stored in the map cache by performing a linear search method, a binary search method, or both, according to a status of the map cache.

20 Claims, 16 Drawing Sheets

(56) References Cited

U.S. PATENT DOCUMENTS

2018/0329712 A1* 11/2018 Palani .................. G06F 12/127
2019/0065387 A1   2/2019 Duzly et al.
2020/0272577 A1*  8/2020 Zeng .................. G06F 12/1018

* cited by examiner

CONTROLLER INCLUDING MAP CACHE AND MEMORY SYSTEM INCLUDING CONTROLLER

CROSS-REFERENCE TO RELATED APPLICATION

The present application claims priority under 35 U.S.C. § 119(a) to Korean patent application number 10-2020-0120336, filed on Sep. 18, 2020, in the Korean Intellectual Property Office, the entire disclosure of which is incorporated by reference herein.

BACKGROUND

1. Technical Field

The present disclosure relates to a controller including a map cache and a memory system including the same, and more particularly, to a controller capable of quickly searching information stored in a map cache, and a memory system including the same.

2. Related Art

A memory system may include a memory device capable of storing data and a controller capable of controlling the memory device.

As memory system storage capacity increases, the number of memory devices or modules in the memory system increases. Accordingly, the number of memory blocks in which data is stored increases, and the number of addresses of the memory blocks increases.

Therefore, during a read operation requested by a host, a time to search for the address of the memory block in which data is stored may increase.

SUMMARY

An embodiment of the present disclosure is a controller capable of quickly searching a position where data is stored by managing a map cache in which addresses are stored in a mixture of a linear method and a binary tree method.

A controller according to an embodiment of the present disclosure includes a descriptor manager configured to generate descriptors including logical addresses and physical addresses respectively mapped to the logical addresses, a map cache configured to store the descriptors in a linear structure and a binary tree structure, and a map search engine configured to search for a descriptor corresponding to a logical address received from an external device among the descriptors stored in the map cache by performing a linear search method, a binary search method, or both, according to a status of the map cache.

A memory system according to an embodiment of the present disclosure includes a memory device including memory blocks, each storing physical addresses, and a controller configured to communicate with the memory device using a physical address among the physical addresses and communicate with a host using a logical address corresponding to the physical address, the controller including a map cache, wherein the controller is configured to generate descriptors by mapping logical addresses and physical addresses, respectively, store the descriptors in the map cache in a linear structure and a binary tree structure, and search for a descriptor corresponding to the logical address by selectively performing a linear search method or a binary search method or simultaneously performing both the linear search method and the binary search method, according to a status of the map cache when receiving a read request for the logical address from the host.

A memory system according to an embodiment of the present disclosure includes a memory device including a plurality of memory blocks, each memory block having physical addresses, and a controller including a first queue and a second queue, configured to generate descriptors, each descriptor indicating a mapping relationship between a logical address and a physical address, sequentially store the descriptors in the first queue in a linear structure and then store the descriptors in the second queue in a binary tree structure, generate status information indicating statuses of the first queue and the second queue, receive a target logical address from a host, and search for a descriptor associated with the target logical address in at least one of the first queue and the second queue based on the status information by performing a linear search on the first queue, performing a binary search on the second queue, or performing the linear search on the first queue and the binary search on the second queue.

The present technology may quickly search a position where data is stored, during a read operation, by managing a map cache in which addresses are stored in a mixture of a linear method and a binary tree method.

DETAILED DESCRIPTION

Figure 1:
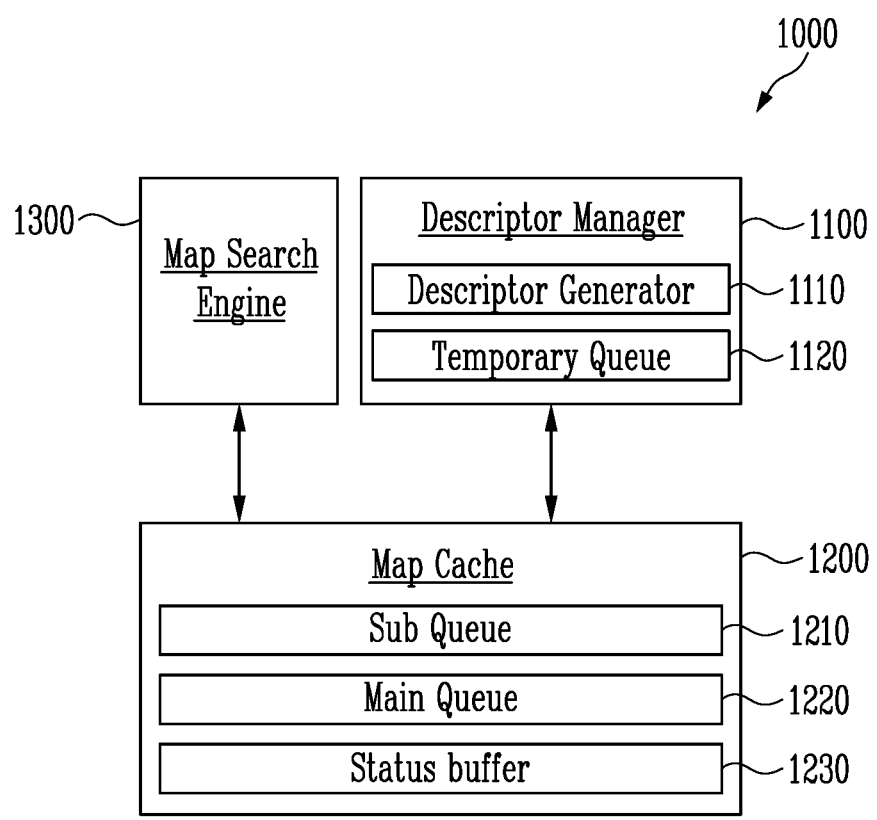
FIG. 1 is a diagram illustrating a controller according to an embodiment of the present disclosure.

FIG. 1 is a diagram illustrating a controller 1000 according to an embodiment of the present disclosure.

Referring to FIG. 1, the controller 1000 may include a descriptor manager 1100, a map cache 1200, and a map search engine 1300.

During a program operation, the descriptor manager 1100 may generate descriptors for respective logical addresses and sequentially output the generated descriptors. During a read operation, the descriptor manager 1100 may receive a descriptor output from the map cache 1200. In some embodiments, the descriptor manager 1100 may include a descriptor generator 1110 and a temporary queue 1120.

The descriptor generator 1110 may be configured to generate each descriptor including a physical address mapped to the corresponding logical address during the program operation. Here, the logical address may be an address communicated between a host and the controller 1000, and the physical address may be an address communicated between the controller 1000 and the memory device. The descriptor generator 1110 may generate various pieces of information corresponding to the logical address in the descriptor, in addition to the physical address.

The temporary queue 1120 may sequentially queue the descriptors output from the descriptor generator 1110 and sequentially output the queued descriptors. For example, the temporary queue 1120 may be configured as a buffer capable that temporarily stores the descriptors.

The map cache 1200 may store the descriptors including the information on the mapped addresses. For example, the map cache 1200 may include a sub queue 1210 and a main queue 1220 configured to store the descriptors using different methods, and may include a status buffer 1230 capable of storing information on a status of the sub queue 1210 and the main queue 1220.

The descriptor manager 1100 may perform an operation for storing the descriptor in the sub queue 1210 and the main queue 1220.

The descriptor manager 1100 may store the descriptors in the sub queue 1210 in a linear structure. For example, the sub queue 1210 may sequentially store the input descriptors in memory regions.

The descriptor manager 1100 may store the descriptors in the main queue 1220 in a binary tree structure. For example, the descriptor manager 1100 may be configured to calculate the descriptors output from the sub queue 1210 in the binary tree structure and store the calculated descriptors in the main queue 1220.

The descriptors input to the map cache 1200 may be stored in the main queue 1220 through the sub queue 1210. Since a complex operation for storing the descriptors in the binary tree structure is to be performed, the remaining descriptors wait in the sub queue 1210 while the descriptors to be input to the main queue 1220 are operated and stored. The descriptors waiting in the sub queue 1210 may be sequentially transmitted to the main queue 1220 whenever the operation of the main queue 1220 is ended.

The status buffer 1230 may store the information on the status of the descriptors stored in each of the sub queue 1210 and the main queue 1220. For example, the descriptor manager 1100 may store, in the status buffer 1230, status information indicating to where a particular descriptor is input, i.e., to the sub queue 1210, to the main queue 1220, not to either the sub queue 1210 or the main queue 1220, or to both the sub queue 1210 and the main queue 1220.

For example, when a descriptor is stored only in the sub queue 1210 and not in the main queue 1220, the status information indicating that the descriptor is stored only in the sub queue 1210 may be stored in the status buffer 1230. Such status information may be stored in the status buffer 1230 at an initial stage when the descriptors are input to the map cache 1200.

When a descriptor is stored in the sub queue 1210 and the main queue 1220, the status information indicating that the descriptor is stored in both queues may be stored in the status buffer 1230. This may be an intermediate status in which the descriptor is stored in the map cache 1200.

When the descriptor is stored only in the main queue 1220 and not in the sub queue 1210, the status information indicating that the descriptor is stored only in the main queue 1220 may be stored in the status buffer 1230. This may be a late status in which the descriptors of a certain capacity are input to the map cache 1200.

When the descriptor is not stored in either the sub queue 1210 or the main queue 1220, the status information may not be stored in the status buffer 1230. This may be a status in which the descriptor is not present in the map cache 1200.

The map search engine 1300 may be configured to search for a target descriptor stored in the map cache 1200. During the read operation, the map search engine 1300 may search for a descriptor corresponding to a selected logical address in the map cache 1200. In some embodiments, the map search engine 1300 may search for such a descriptor by selecting the sub queue 1210 or the main queue 1220 as the search domain according to the status information stored in the status buffer 1230, or simultaneously search both the sub queue 1210 and the main queue 1220 for the descriptor of interest. For example, when the descriptor is stored only in the sub queue 1210, the map search engine 1300 may search for the descriptor in the sub queue 1210 using a linear search method. When the descriptor is stored only in the main queue 1220, the map search engine 1300 may search for the descriptor in the main queue 1220 using a binary search method. When the descriptor is stored in the sub queue 1210 and the main queue 1220, the map search engine 1300 may search for the descriptor in the sub queue 1210 using the linear search method, and search for the descriptor in the main queue 1220 using the binary search method, simultaneously. That is, when the descriptor is stored in the sub queue 1210 and the main queue 1220, the map search engine 1300 may simultaneously search the sub queue 1210 and the main queue 1220 using different methods.

When the descriptor corresponding to the selected logical address is detected in the sub queue 1210 or the main queue 1220, the map cache 1200 may output the detected descriptor to the descriptor manager 1100.

Each of the above-described devices is specifically described as follows.

Figure 2:
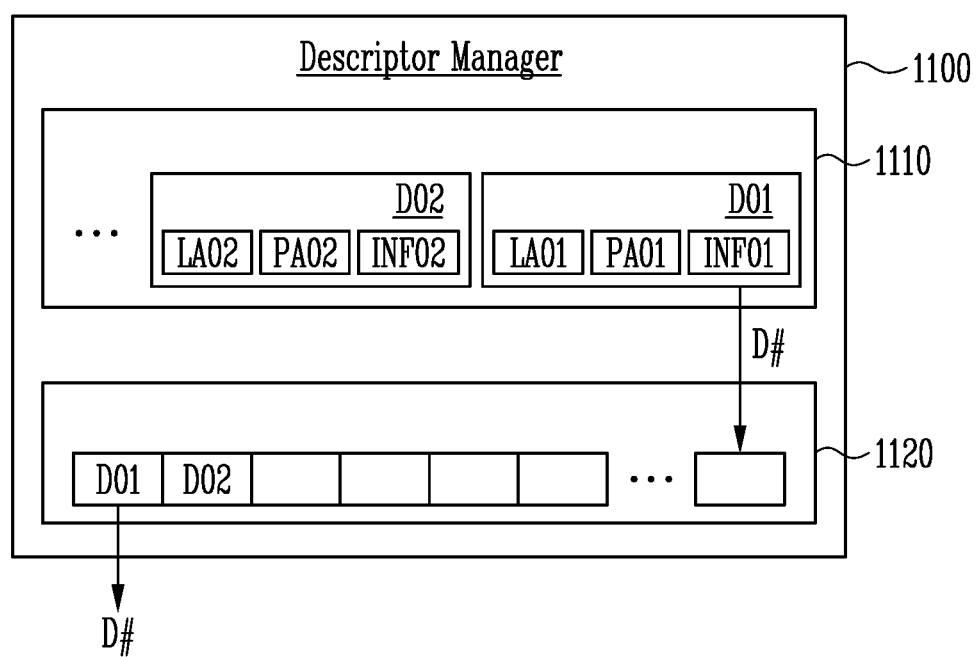
FIG. 2 is a diagram illustrating a descriptor manager shown in FIG. 1.

FIG. 2 is a diagram illustrating the descriptor manager 1100 shown in FIG. 1.

Referring to FIG. 2, the descriptor manager 1100 may include the descriptor generator 1110 and the temporary queue 1120.

The descriptor generator 1110 may generate the descriptor including the logical address and the physical address mapped to each other during the program operation. In addition, the descriptor generator 1110 may further generate various pieces of information corresponding to the logical address in the descriptor. For example, various pieces of information such as an offset for successive addresses may be further included in the descriptor.

The descriptor generator 1110 may generate a first descriptor D01 corresponding to a first logical address LA01 as follows. When a first physical address PA01 is mapped to the first logical address LA01, the descriptor generator 1110 may generate first descriptor D01 including the first logical address LA01 and the first physical address PA01. When additional information corresponding to the first logical address LA01 is present, the descriptor generator 1110 may further include first information INF01 in the first descriptor D01. After the first descriptor D01 is generated, the descriptor generator 1110 may generate a second descriptor D02.

For example, the second descriptor D02 may include a second logical address LA02, a second physical address PA02 mapped thereto, and second information INF02. In such a method, during the program operation, the descriptor generator 1110 may sequentially generate descriptors D #.

The temporary queue 1120 may be configured to store and output the descriptors D # generated by the descriptor generator 1110 in the linear structure, as illustrated in FIG. 2. For example, when the first descriptor D01 is generated by the descriptor generator 1110, the temporary queue 1120 may temporarily store the first descriptor D01. Subsequently, when the second descriptor D02 is generated by the descriptor generator 1110, the temporary queue 1120 may temporarily store the second descriptor D02 in a next ordered position with respect to the first descriptor D01. A plurality of descriptors including D01 and D02 temporarily stored in the temporary queue 1120 may be sequentially output when the map cache 1200 of FIG. 1 is ready to receive the descriptors. When the map cache 1200 is not ready to receive any or a next descriptor D # or the map cache 1200 is full, the temporary queue 1120 may delay the output of the first or next descriptor D # until the map cache 1200 is capable receiving the descriptor D #.

Figure 3:
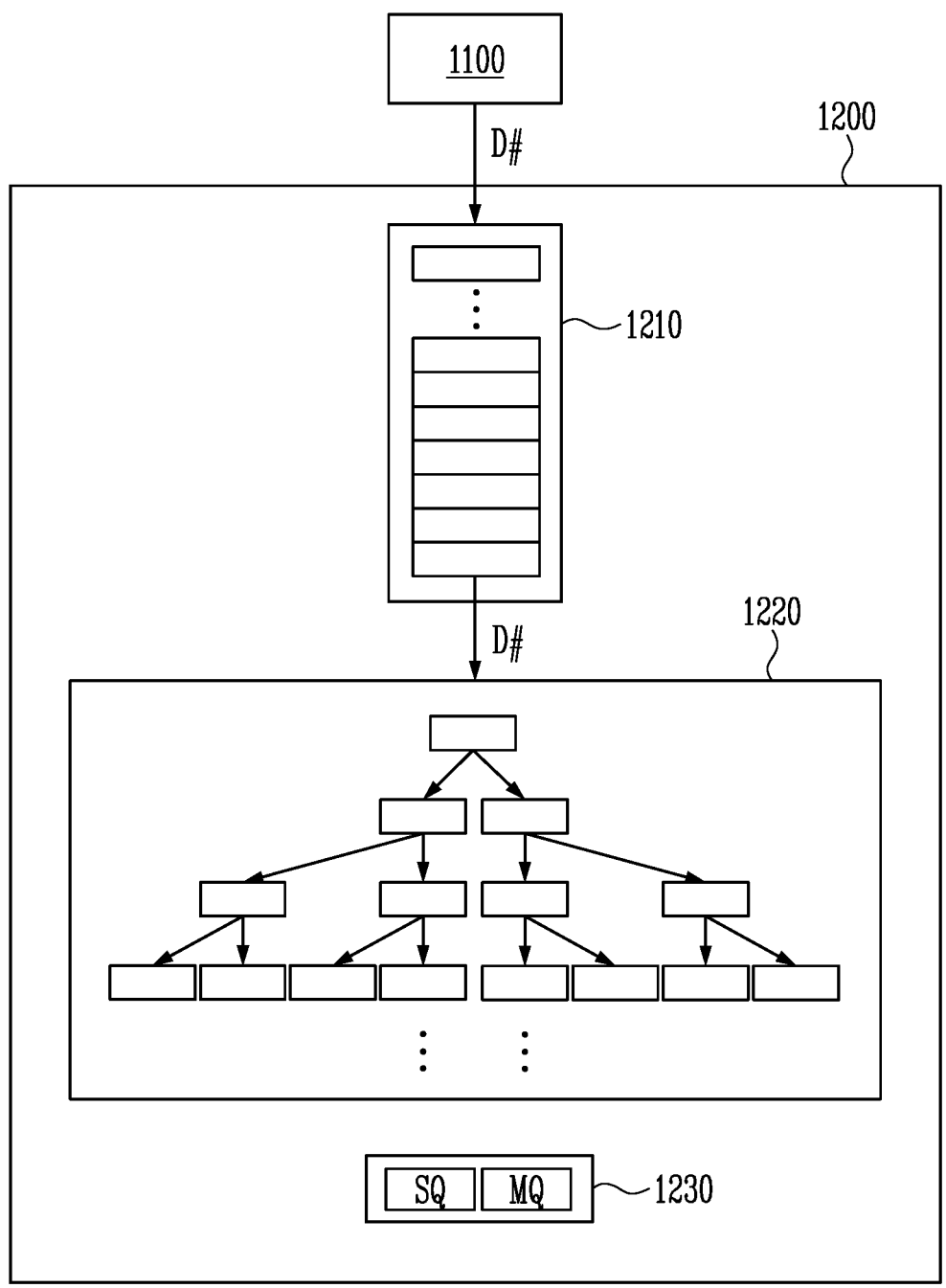
FIG. 3 is a diagram illustrating a map cache according to an embodiment of the present disclosure.

FIG. 3 is a diagram illustrating a map cache 1200 according to an embodiment of the present disclosure.

Referring to FIG. 3, the map cache 1200 may include the sub queue 1210, the main queue 1220, and the status buffer 1230. The descriptors D # input to the map cache 1200 may be sequentially stored in the main queue 1220 through the sub queue 1210. The sub queue 1210 may sequentially store the descriptors D # in the linear structure, whereas the main queue 1220 may store the descriptors D # in the binary tree structure.

For example, when the descriptor manager 1100 does not perform a calculation the descriptor D # in the binary tree structure, the descriptor manager 1100 may transmit the descriptor D # input to the sub queue 1210 to the main queue 1220. As the number of descriptors D # transmitted to the main queue 1220 increases, the calculation for storing the descriptors D # in the binary tree structure becomes more complex, and thus the time it takes to store the descriptor D # in the main queue 1220 may increase. In this case, the descriptor manager 1100 may wait without transmitting a descriptor D # stored in the sub queue 1210 to the main queue 1220 until the main queue 1220 is able to receive another descriptor D #.

When the main queue 1220 may receive another descriptor D #, the descriptor manager 1100 may transmit the descriptor D # directly to the main queue 1220.

As shown in the sub queue 1210, the linear structure means a structure in which the descriptors D # are stored in the memory regions in the order in which the descriptors D # are input. For example, each of the memory regions may have one input node and one output node. Therefore, the descriptor D # may be input to the memory region through the input node and then output through one output node.

As shown in the main queue 1220, the binary tree structure is configured of memory regions having one input node and two output nodes. For example, since each of the memory regions has one input node and two output nodes, when a descriptor D # is input through the input node, the descriptor D # may be output through any one of the two output nodes.

The status buffer 1230 may store information on the status of each of the sub queue 1210 and the main queue 1220. For example, the status buffer 1230 may include two memory buffers. The status information of the sub queue 1210 may be stored in a first memory buffer SQ, and the status information of the main queue 1220 may be stored in a second memory buffer MQ. When valid data is stored in the first memory buffer SQ, this indicates a status that the corresponding descriptor D # is stored in the sub queue 1210. When valid data is stored in the second memory buffer MQ, this indicates a status that the corresponding descriptor D # is stored in the main queue 1220. When invalid data is stored in both of the first and second memory buffers SQ and MQ, this means that the descriptor D # is not stored in either the sub queue SQ 1210 or the main queue 1220. When valid data is stored in both of the first and second memory buffers SQ and MQ, this means that the descriptor D # is stored in both the sub queue 1210 and the main queue 1220. Here, valid data may be 1 and invalid data may be 0, but reverse logic could be used according to the controller.

When the descriptor D # is stored in the sub queue 1210, the descriptor manager 1100 may store status data of 1 in the first memory buffer SQ. When the descriptor D # is input to the main queue 1220, the descriptor manager 1100 may store the status data of 1 in the second memory buffer MQ.

When the descriptor D # is not stored in the sub queue 1210, the descriptor manager 1100 may store status data of 0 in the first memory buffer SQ. When the descriptor D # is not stored in the main queue 1220, the descriptor manager 1100 may store the status data of 0 in the second memory buffer MQ.

When the descriptor is not stored in either the sub queue 1210 or the main queue 1220, the descriptor manager 1100 may store the status data of 0 in the first and second memory buffers SQ and MQ.

When the descriptor is stored in the sub queue 1210 and the main queue 1220, the descriptor manager 1100 may store the status data of 1 in the first and second memory buffers SQ and MQ.

Figure 4:
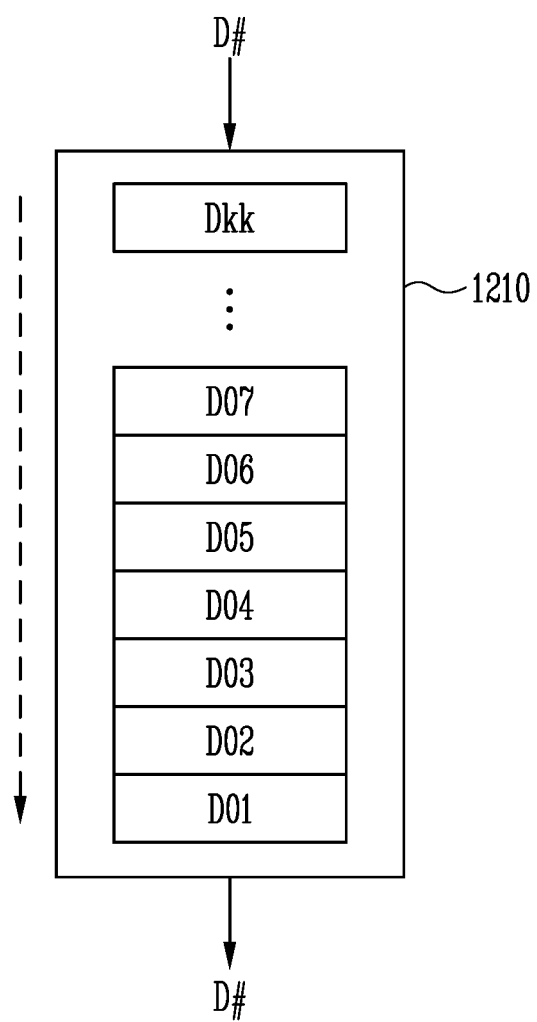
FIG. 4 is a diagram illustrating a sub queue according to an embodiment of the present disclosure.

FIG. 4 is a diagram illustrating a sub queue 1210 according to an embodiment of the present disclosure.

Referring to FIG. 4, the descriptor manager 1100 of FIG. 3 may store the descriptors D # in the sub queue 1210 in the linear structure. For example, when first to kk-th descriptors D01 to Dkk are input to the sub queue 1210, the first to kk-th descriptors D01 to Dkk may be sequentially stored in the memory regions of the sub queue 1210, and the first to kk-th descriptors D01 to Dkk may be sequentially output.

Figure 5A:
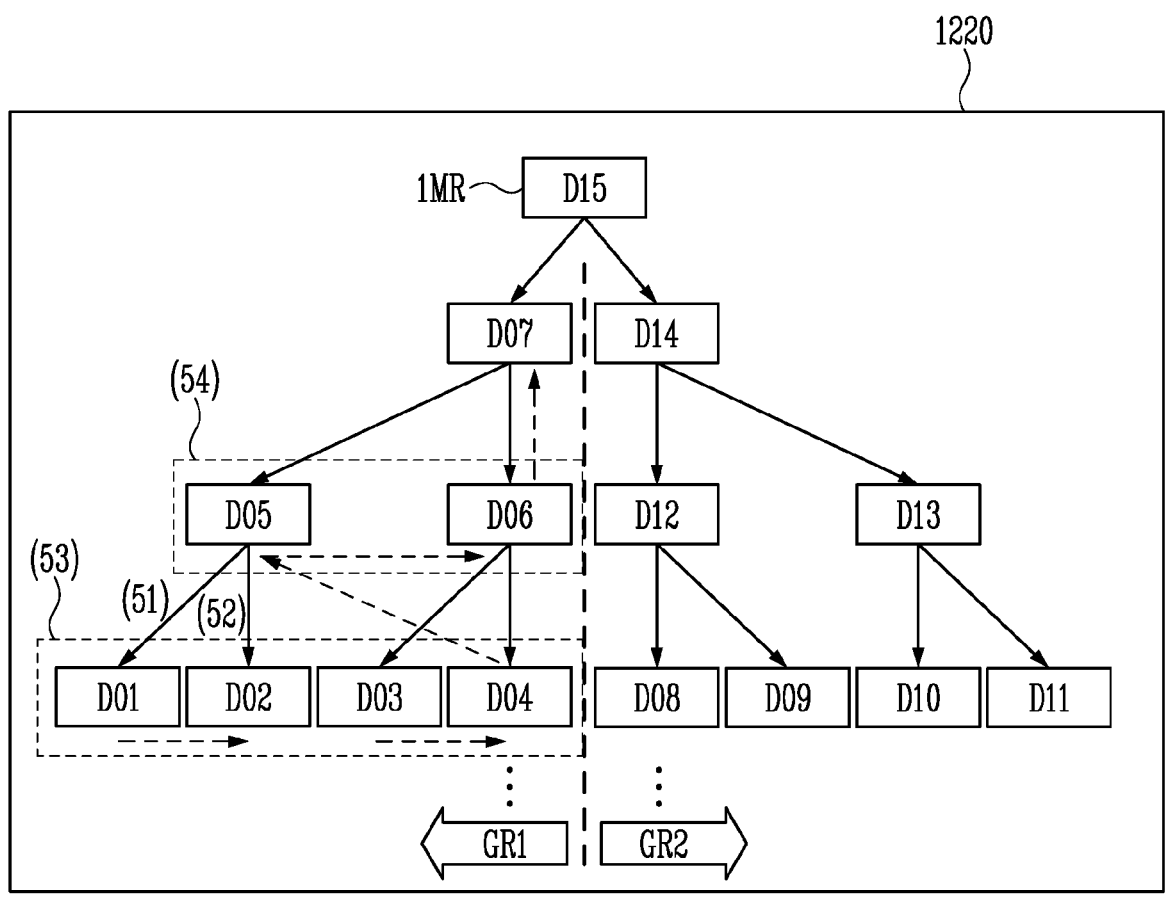
FIGS. 5A to 5C are diagrams illustrating a main queue according to an embodiment of the present disclosure.
Figure 5B:
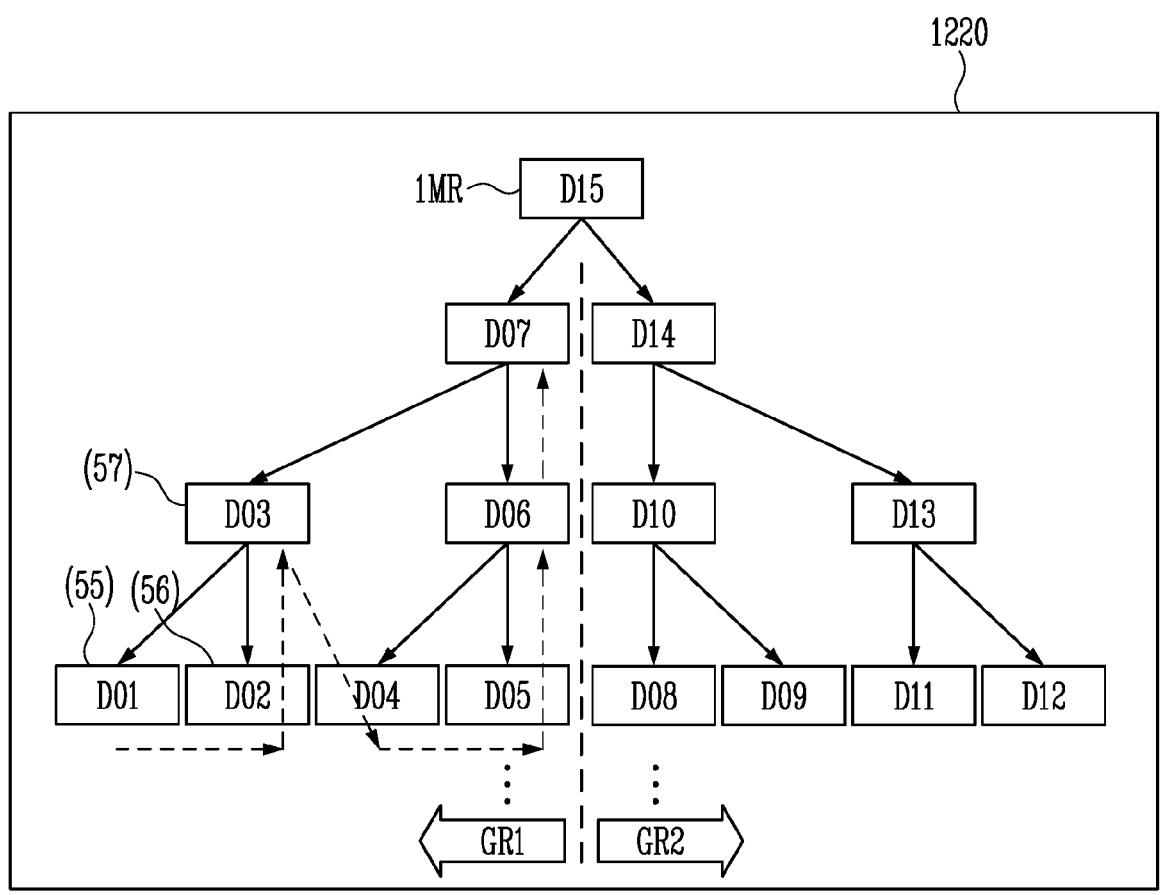
Figure 5C:
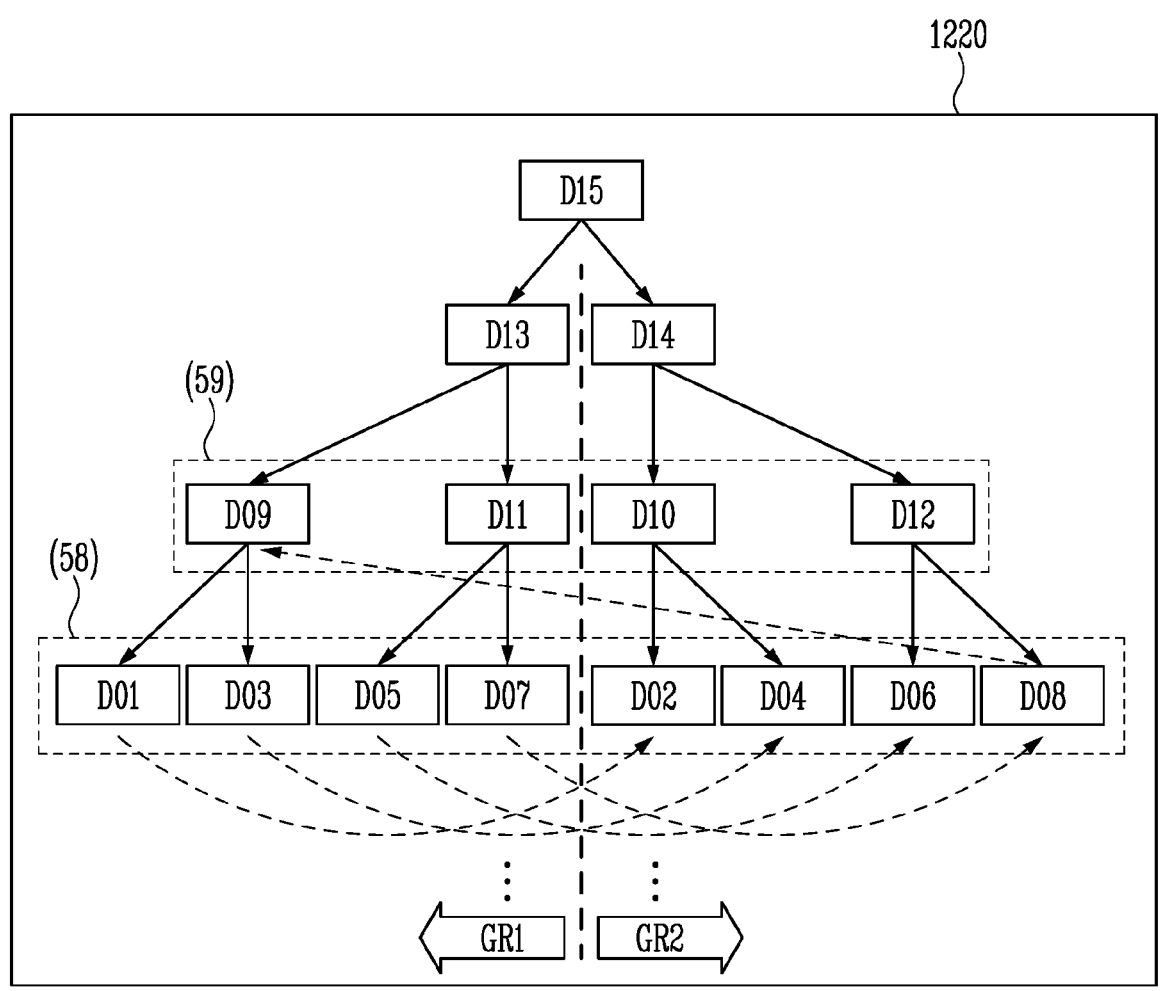

FIGS. 5A to 5C are diagrams illustrating a main queue 1220 in which descriptors are stored in various binary tree structures, according to various embodiments of the present disclosure.

Referring to the embodiment shown in FIG. 5A, the binary tree structure may be divided into two groups GR1 and GR2 on a left side and a right side based on a first memory region 1MR. When all memory regions in the first group GR1 are filled with descriptors, the descriptors may be stored in memory regions in the second group GR2. For example, the descriptor input to the memory region of the main queue 1220 may be transmitted to another memory region through a left output node 51, and a next input descriptor may be transmitted to another memory region through a right output node 52. When the descriptors are stored in all memory regions of the same level 53, the descriptors may be sequentially stored in memory regions of an upper level 54. In such a method, when the descriptors are stored in all memory regions in the first group GR1, the descriptors may be stored in the memory regions in the second group GR2.

Referring to the embodiment shown in FIG. 5B, when all memory regions in any one of the first and second groups GR1 and GR2, divided based on the first memory region 1MR, are filled, the descriptors may be stored in memory regions in a next group. For example, among the memory regions in the first group GR1, the memory regions may be sequentially filled starting from the left memory region. That is, when the first descriptor D01 is stored in a selected memory region 55, the second descriptor D02 may be stored in another memory region 56 connected to the same memory region 57 as the selected memory region 55. The third descriptor D03 may be stored in the memory region 57 connected to the memory regions 55 and 56 in which the first and second descriptors D01 and D02 are stored. In such a method, the memory regions in the first group GR1 may be sequentially filled from the left.

Referring to the embodiment shown in FIG. 5C, the descriptors may be alternately stored in the memory regions in the first and second groups GR1 and GR2 divided based on the first memory region 1MR. For example, when descriptors D01 to D08 are stored while alternately selecting the first group GR1 and the second group GR2 in memory regions in the same level 58, descriptors D09 to D12 may be stored while alternately selecting the first group GR1 and the second group GR2 also in memory regions in an upper level 59.

In addition to the embodiments described with reference to FIGS. 5A to 5C, the descriptors may be stored in the binary tree structure using other methods consistent with the teachings herein.

Figure 6:
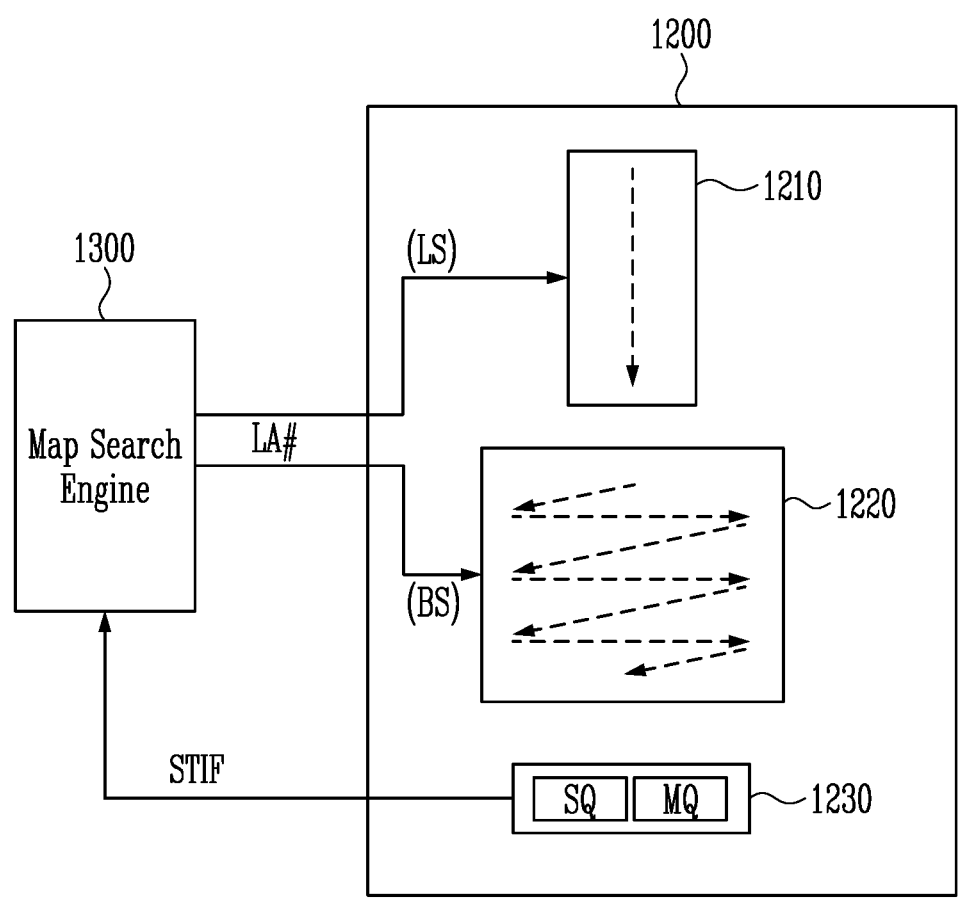
FIG. 6 is a diagram illustrating a map search engine according to an embodiment of the present disclosure.

FIG. 6 is a diagram illustrating a map search engine according to an embodiment of the present disclosure.

Referring to FIG. 6, during a read operation or a suspend read operation, the map search engine 1300 may search for a logical address LA # corresponding to a read target in the sub queue 1210, the main queue 1220, or in both the sub queue 1210 and the main queue 1220 simultaneously. To this end, before searching the sub queue 1210 or the main queue 1220, the map search engine 1300 may first receive a status information STIF stored in the status buffer 1230 and select a queue in which the descriptor(s) are stored. For example, the map search engine 1300 may receive the status information STIF stored in the first and second memory buffers SQ and MQ in the status buffer 1230, and select the sub queue 1210 or the main queue 1220 or select both the sub queue 1210 and the main queue 1220 according to the received status information STIF. Subsequently, the map search engine 1300 may search for a descriptor corresponding to the logical address LA # in the selected queue. For example, the map search engine 1300 may search for the descriptor corresponding to the logical address LA # using a linear search (LS) method in the sub queue 1210, and may search for the descriptor corresponding to the logical address LA # using a binary search (BS) method in the main queue 1220.

In the LS method, since the memory regions in the sub queue 1210 are sequentially searched, when the descriptor corresponding to the logical address LA # is early in the order, a search operation may be quickly completed. However, when the descriptor corresponding to the logical address LA # is in the back of the order, the search operation may take longer and thus be completed later.

In the BS method, since the memory regions in the main queue 1220 are non-linearly searched, as the number of descriptors increases, a probability that the search operation is completed quickly compared to the LS method may increase. That is, a probability that the descriptor corresponding to the logical address LA # is quickly found in the search is higher in the main queue 1220 than in the sub queue 1210.

In the BS method, the memory regions in the main queue 1220 may be divided in half, and the search operation may be performed in a selected group. The search operation may continue by selecting another group when the descriptor corresponding to the logical address LA # is not present in the first selected group and dividing the newly selected group in half.

FIGS. 7A to 7D are diagrams illustrating a method of searching for a descriptor according to an embodiment of the present disclosure.

Figure 7A:
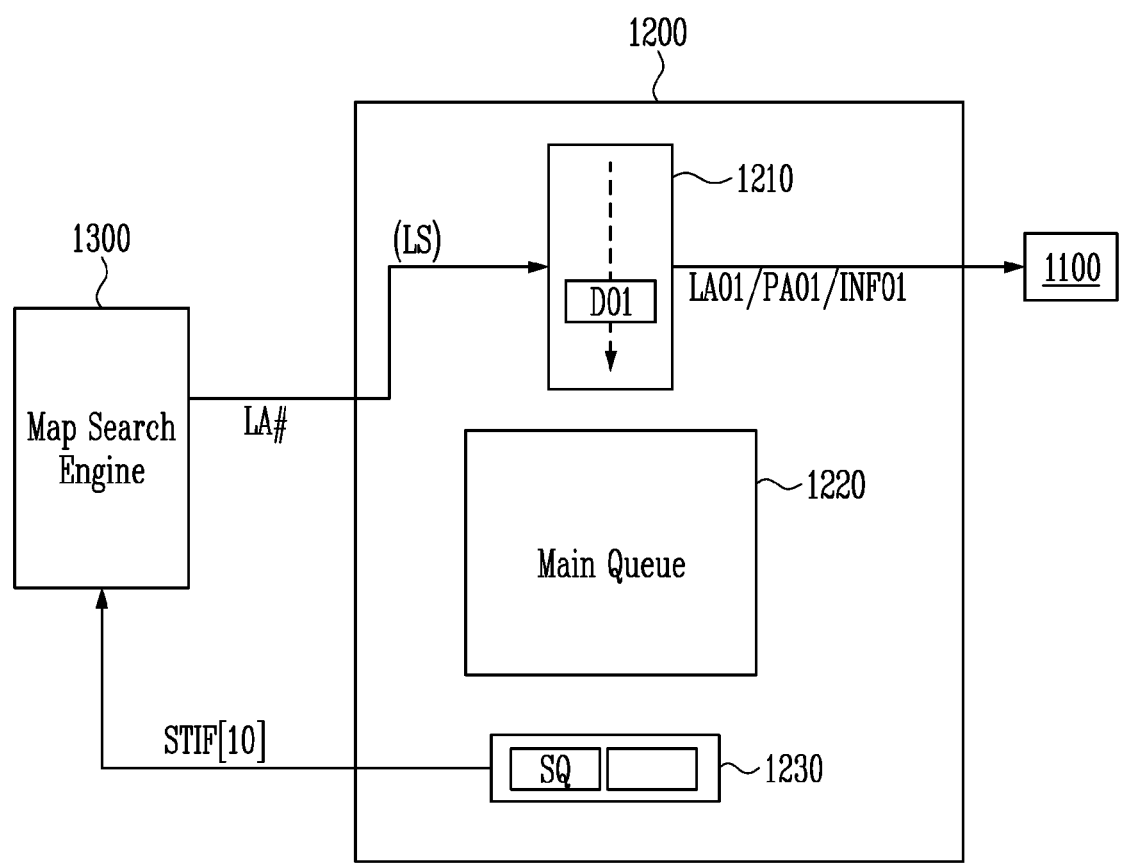
FIGS. 7A to 7D are diagrams illustrating a method of searching for a descriptor according to an embodiment of the present disclosure.

Referring to FIG. 7A, when the status information STIF stored in the status buffer 1230 indicates that the descriptors are stored only in the sub queue 1210 (STIF[10]), the map search engine 1300 may search for the descriptor corresponding to the logical address LA # in the sub queue 1210 but not in the main queue 1220 according to the LS method.

When the descriptor D01 corresponding to the logical address LA # is detected in the sub queue 1210, the detected descriptor D01 may be transmitted to the descriptor manager 1100. For example, when the map search engine 1300 searches for the descriptor corresponding to the first logical address LA01, the first descriptor D01 including the first logical address LA01 may be detected, and the first logical address LA01, the first physical address PA01, and the first information INF01 in the first descriptor D01 may be transmitted to the descriptor manager 1100. When the descriptor manager 1100 receives the first logical address LA01, the first physical address PA01, and the first information INF01, the controller 1000 of FIG. 1 including the descriptor manager 1100 may output a command and an address to the memory device for performing the read operation according to the address and the information.

Figure 7B:
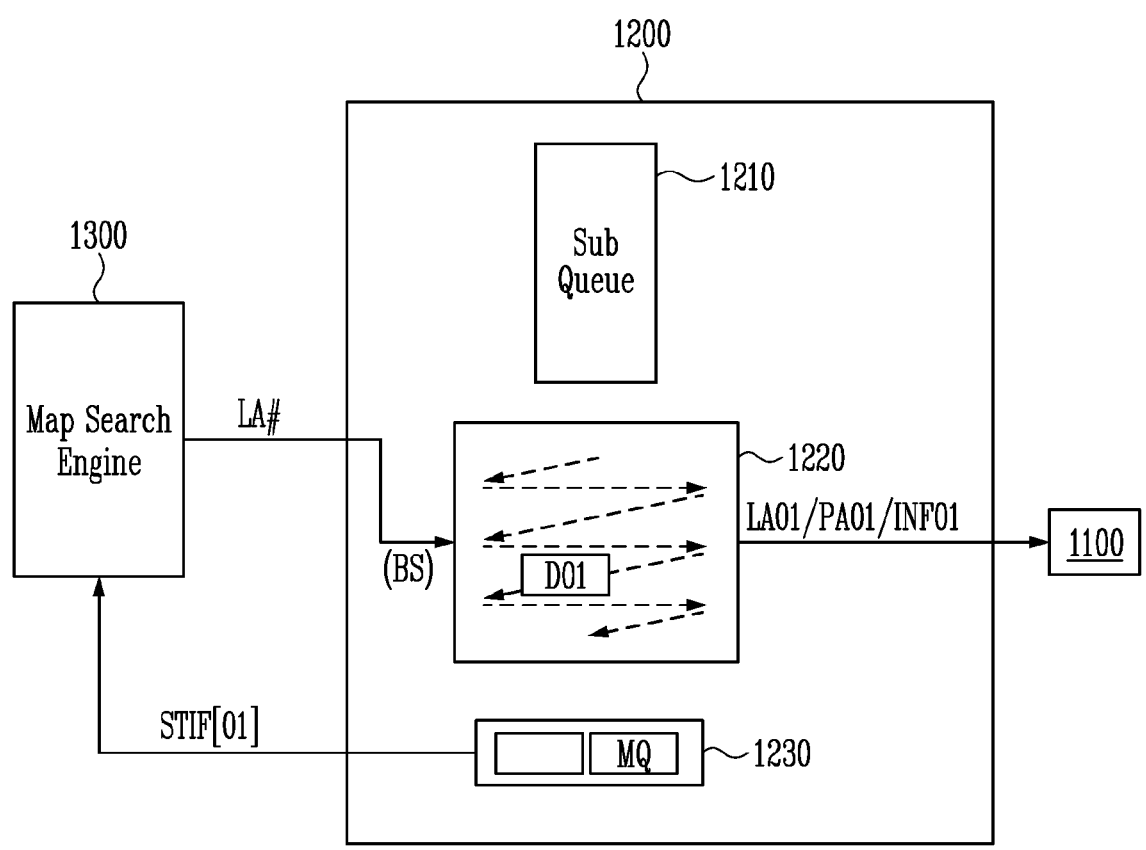

Referring to FIG. 7B, when the status information STIF in the status buffer 1230 indicates that the descriptors are stored only in the main queue 1220 (STIF[01]), the map search engine 1300 may search for the descriptor corresponding to the logical address LA # in the main queue 1220 but not in the sub queue 1210 according to the BS method.

When the descriptor D01 corresponding to the logical address LA # is detected in the main queue 1220, the detected descriptor D01 may be transmitted to the descriptor manager 1100. For example, when the map search engine 1300 searches for the descriptor corresponding to the first logical address LA01, the first descriptor D01 including the first logical address LA01 may be detected, and the first logical address LA01, the first physical address PA01, and the first information INF01 in the first descriptor D01 may be transmitted to the descriptor manager 1100. When the descriptor manager 1100 receives the first logical address LA01, the first physical address PA01, and the first information INF01, the controller 1000 of FIG. 1 including the descriptor manager 1100 may output the command and the address to the memory device for performing the read operation according to the address and the information.

Figure 7C:
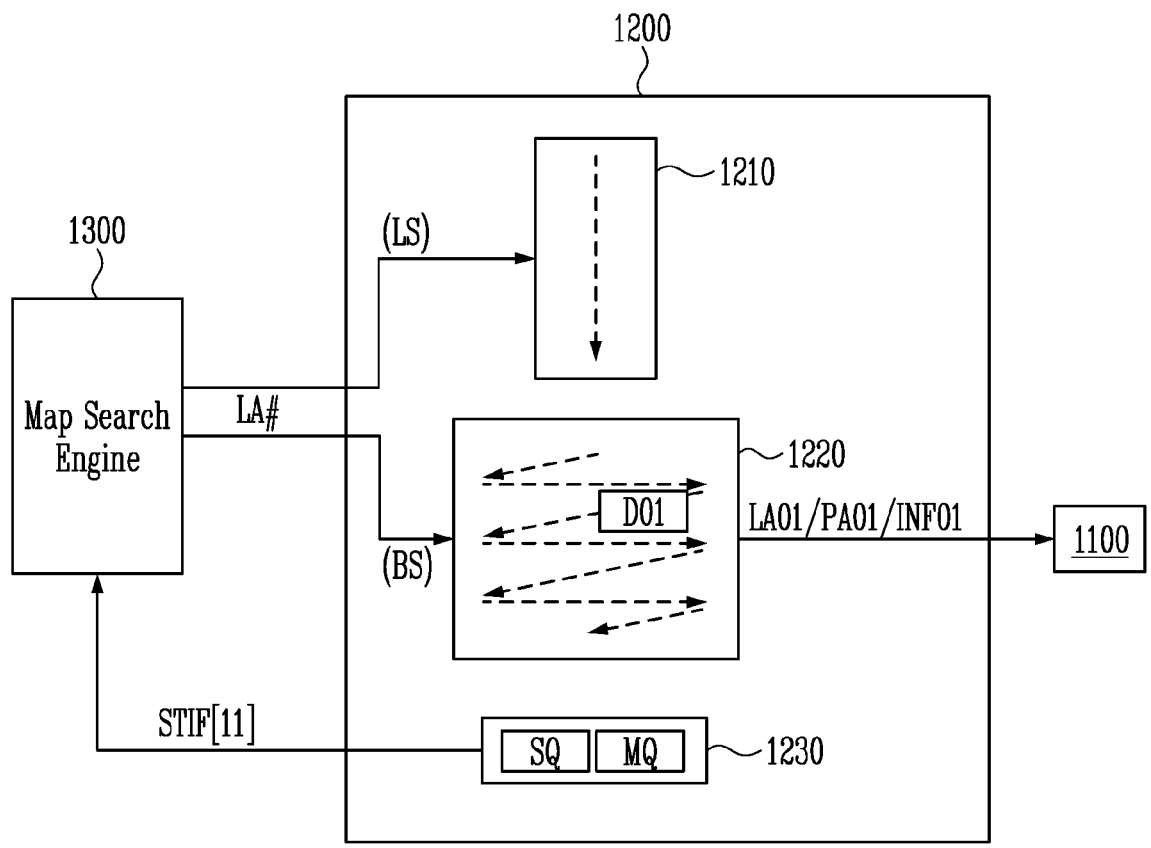

Referring to FIG. 7C, when status information STIF stored in the status buffer 1230 indicates that the descriptors are stored in the sub queue 1210 and the main queue 1220 (STIF[11]), the map search engine 1300 may simultaneously search for the descriptor corresponding to the logical address LA # in both the sub queue 1210 and the main queue 1220.

For example, the descriptor may be searched according to the LS method in the sub queue 1210, and the descriptor may be searched according to the BS method in the main queue 1220.

When the descriptor D01 corresponding to the logical address LA # is detected in the main queue 1220, the detected descriptor D01 may be transmitted to the descriptor manager 1100. For example, when the map search engine 1300 searches for the descriptor corresponding to the first logical address LA01, the first descriptor D01 including the first logical address LA01 may be detected, and the first logical address LA01, the first physical address PA01, and the first information INF01 in the first descriptor D01 may be transmitted to the descriptor manager 1100. When the descriptor manager 1100 receives the first logical address LA01, the first physical address PA01, and the first information INF01, the controller 1000 of FIG. 1 including the descriptor manager 1100 may output the command and the address to the memory device for performing the read operation according to the received first logical address LA01, first physical address PA01, and first information INF01.

Figure 7D:
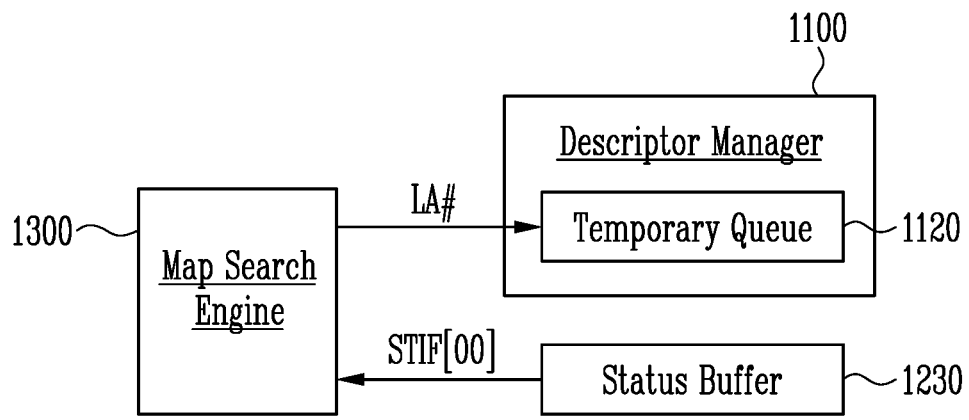

Referring to FIG. 7D, when status information STIF stored in the status buffer 1230 indicates that the descriptors are not stored in either the sub queue 1210 or the main queue 1220 (STIF[00]), the map search engine 1300 may not search the sub queue 1210 and the main queue 1220, and instead may search for the descriptor in the temporary queue 1120 in the descriptor manager 1100. That is, that the descriptors are not stored in the sub queue 1210 and the main queue 1220 may mean that the descriptor manager 1100 did not output the descriptor, and in this case, the descriptor may wait in the temporary queue 1120 of the descriptor manager 1100. Therefore, the map search engine 1300 may search for the descriptor corresponding to the logical address LA # among the descriptors waiting in the temporary queue 1120.

Figure 8:
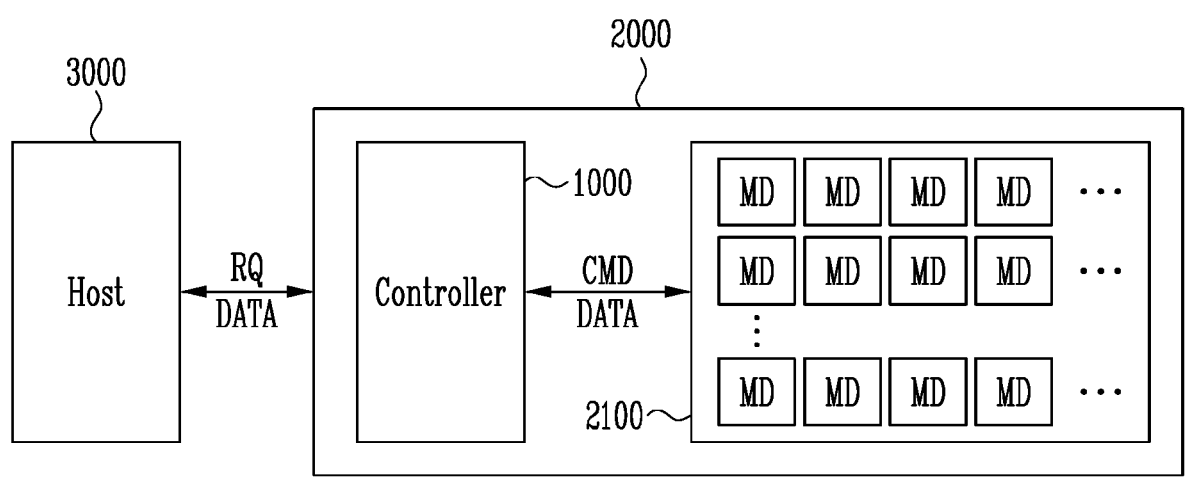
FIG. 8 is a diagram illustrating a memory system according to an embodiment of the present disclosure.

FIG. 8 is a diagram illustrating a memory system according to an embodiment of the present disclosure.

Referring to FIG. 8, the controller 1000 may be used in the memory system 2000. For example, the memory system 2000 may include a storage device 2100 configured to store data and the controller 1000. The storage device 2100 may include a plurality of memory devices MD, which may be connected to the controller 1000 through input/output lines.

The controller 1000 may communicate between a host 3000 and the storage device 2100. The controller 1000 may include components shown in FIG. 1. The controller 1000 may generate a command CMD for controlling the memory devices MD according to a request RQ of the host 3000. Even in the absence of a request from the host 3000, the controller 1000 may perform on its own initiative a background operation for improving performance of the memory system 2000.

The host 3000 may generate the requests RQ for various operations and may output the generated requests RQ to the memory system 2000. For example, the requests RQ may include a program request that may control a program operation, a read request that may control a read operation, an erase request that may control an erase operation, and the like. In addition, the host 3000 may transmit a suspend request to the memory system 2000 to stop (or suspend) an operation that is currently in progress in the memory system 2000 and to perform an operation corresponding to the suspend request with priority.

For example, when the host 3000 transmits data DATA and the program request RQ to the memory system 2000, the controller 1000 may generate a descriptor including a physical address of a memory block in which the data DATA is to be stored, and a logical address mapped to the physical address, and may perform a program operation on the memory device MD corresponding to the physical address.

Before the program operation that is being performed in the memory system 2000 is completed, the host 3000 may transmit the suspend read request RQ to the memory system 2000 in order to read data. In this case, the controller 1000 may search for the descriptor corresponding to the logical address, perform a read operation according to the physical address in the descriptor found in the search, and output the read data to the host 3000.

The host 3000 may communicate with the memory system 2000 through any of various interfaces such as peripheral component interconnect express (PCIe), advanced technology attachment (ATA), serial ATA (SATA), parallel ATA (PATA), serial attached SCSI (SAS), non-volatile memory express (NVMe) a universal serial bus (USB), a multi-media card (MMC), an enhanced small disk interface (ESDI), or integrated drive electronics (IDE).

Figure 9:
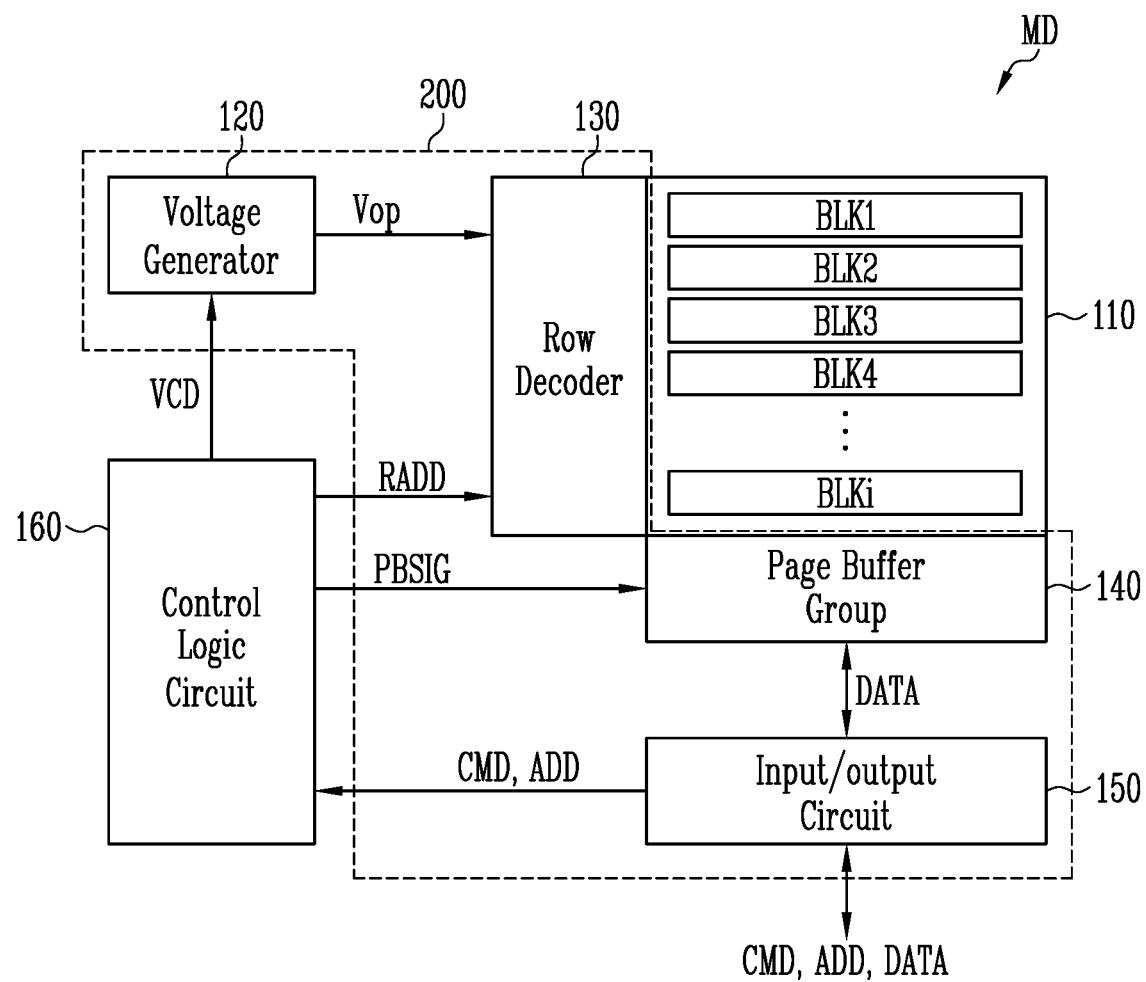
FIG. 9 is a diagram illustrating a memory device according to an embodiment of the present disclosure.

FIG. 9 is a diagram illustrating a representative memory device MD according to an embodiment of the present disclosure.

Referring to FIG. 9, the memory device MD may include a memory cell array 110 in which data is stored, a peripheral circuit 200 that performs a program, read, or erase operation, and a control logic circuit 160 that controls the peripheral circuit 200.

The memory cell array 110 may include a plurality of memory blocks BLK1 to BLKi in which data is stored. Each of the memory blocks BLK1 to BLKi may include a plurality of memory cells. The memory cells may be implemented in a two-dimensional structure in which the memory cells are arranged in parallel to a substrate or a three-dimensional structure in which the memory cells are stacked in a vertical direction on the substrate.

The peripheral circuit 200 may include a voltage generator 120, a row decoder 130, a page buffer group 140, and an input/output circuit 150.

The voltage generator 120 may generate and output operation voltages Vop used for various operations in response to a voltage code VCD. For example, the voltage generator 120 may generate and output a program voltage, a verify voltage, a read voltage, a pass voltage, an erase voltage, and the like having various levels.

The row decoder 130 may select one memory block among the memory blocks BLK1 to BLKi included in the memory cell array 110 according to a row address RADD, and transmit the operation voltages Vop to the selected memory block.

The page buffer group 140 may be connected to the memory cell array 110 through bit lines. For example, the page buffer group 140 may include page buffers connected to the respective bit lines. The page buffers may operate simultaneously in response to page buffer control signals PBSIG, and may temporarily store data during the program or read operation. The verify operation performed during the program operation and the verify operation performed during the erase operation may be performed in a method the same as the read operation. During the read operation or the verify operation, the page buffers may sense a voltage of the bit lines, which vary according to a threshold voltage of the memory cells. That is, it may be determined whether the threshold voltages of the memory cells are lower or higher than the read voltage or the verify voltage according to a result of the sensing operation performed in the page buffers.

The input/output circuit 150 may be connected to the controller 1000 of FIG. 1 through input/output lines. The input/output circuit 150 may input/output a command CMD, an address ADD, and data DATA through the input/output lines. For example, the input/output circuit 150 may transmit the command CMD and the address ADD received through the input/output lines to the control logic circuit 160, and transmit the data DATA received through the input/output lines to the page buffer group 140. The input/output circuit 150 may output the data DATA received from the page buffer group 140 to the controller 1000 through the input/output lines.

The control logic circuit 160 may output the voltage code VCD, the row address RADD, the page buffer control signals PBSIG, and a column address CADD in response to the command CMD and the address ADD. For example, the control logic circuit 160 may include software that performs an algorithm in response to the command CMD, and hardware configured to output various signals according to the address ADD and the algorithm.

Figure 10:
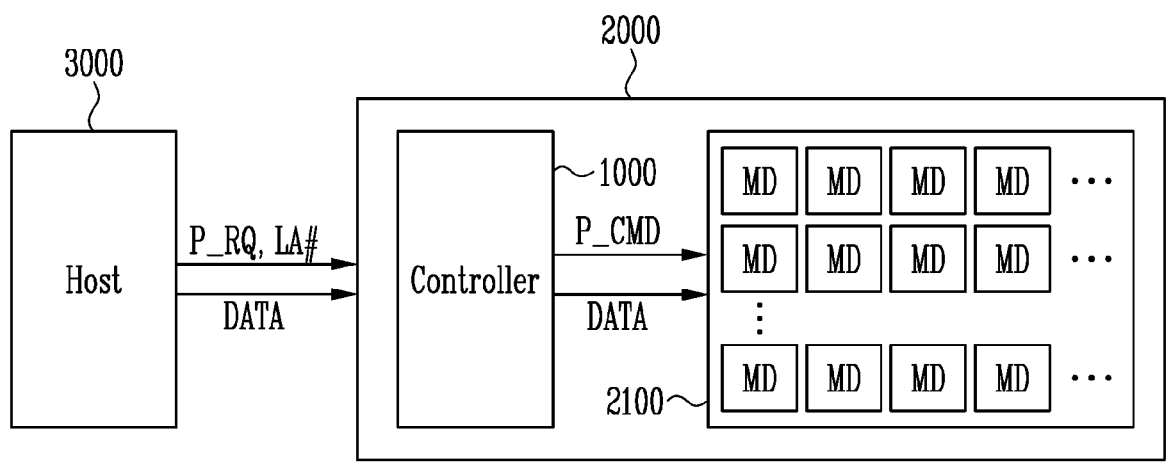
FIG. 10 is a diagram illustrating a program operation according to an embodiment of the present disclosure.

FIG. 10 is a diagram illustrating a program operation according to an embodiment of the present disclosure.

Referring to FIG. 10, during the program operation, the host 3000 may transmit a program request P_RQ, the logical address LA #, and the data DATA to the memory system 2000. According to the program request P_RQ, the controller 1000 may generate the descriptor including the physical address mapped to the logical address LA # as described above, and store the descriptor in the map cache 1200 of FIG. 1. Subsequently, the program operation may be performed by transmitting a program command P_CMD and the data DATA to the memory device MD selected according to the physical address. During the program operation, as an amount of the data DATA increases, an operation time for generating the descriptor and storing the generated descriptor in the map cache 1200 may increase.

Since the controller 1000 transmits a completion command to the host 3000 for a next operation even though not all data is programmed in the selected memory device MD, the host 3000 may transmit a next request to the memory system 2000 while the program operation is in progress in the memory system 2000. For example, the host 3000 may transmit the read request to the memory system 2000 in which the program operation is being performed. An embodiment in which the read request is received from the memory system 2000 is described with reference to FIG. 11.

Figure 11:
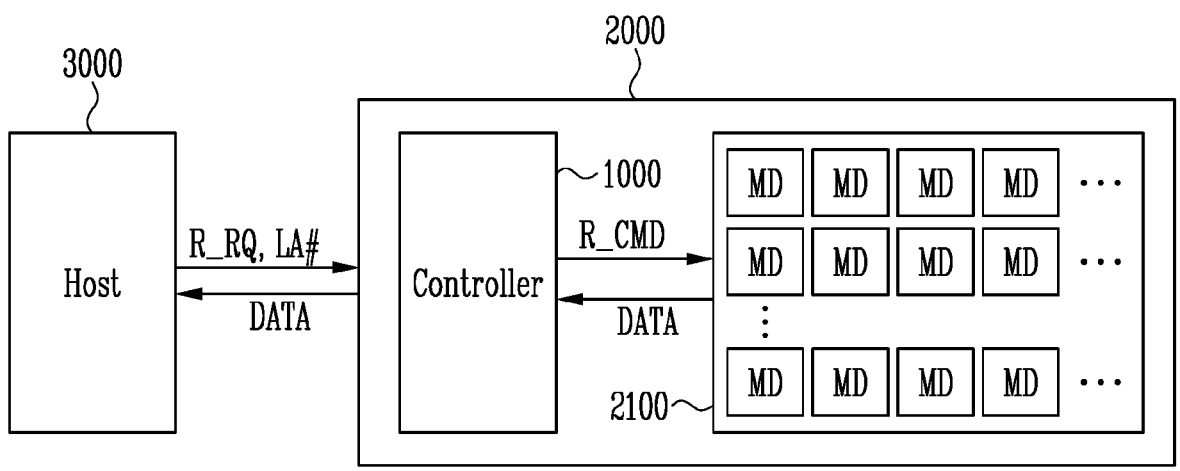
FIG. 11 is a diagram illustrating a read operation according to an embodiment of the present disclosure.

FIG. 11 is a diagram illustrating a read operation according to an embodiment of the present disclosure.

Referring to FIG. 11, while the program operation is in progress in the memory system 2000, the host 3000 may transmit a read request R_RQ and the logical address LA #. In this case, the controller 1000 may search for the physical address mapped to the logical address LA # output from the host 3000. For example, as in the embodiment described with reference to FIGS. 6 to 7C, the descriptor corresponding to the logical address LA # may be searched for and a read command R_CMD may be transmitted to the memory device MD according to the physical address in the detected descriptor. When receiving the read data DATA from the memory device MD, the controller 1000 may output the data DATA to the host 3000.

As described above, during the read operation, as the physical address mapped to the logical address is quickly found in a search, the data DATA may be quickly received from the memory device corresponding to the physical address, and the data DATA may be quickly output to the host 3000. Therefore, as in the embodiment described with reference to FIG. 3, a read operation time may be shortened by dividing the descriptors into each of the sub queue 1210 and the main queue 1220, managing the descriptors, and searching for the descriptor using both the LS method and the BS method simultaneously.

Figure 12:
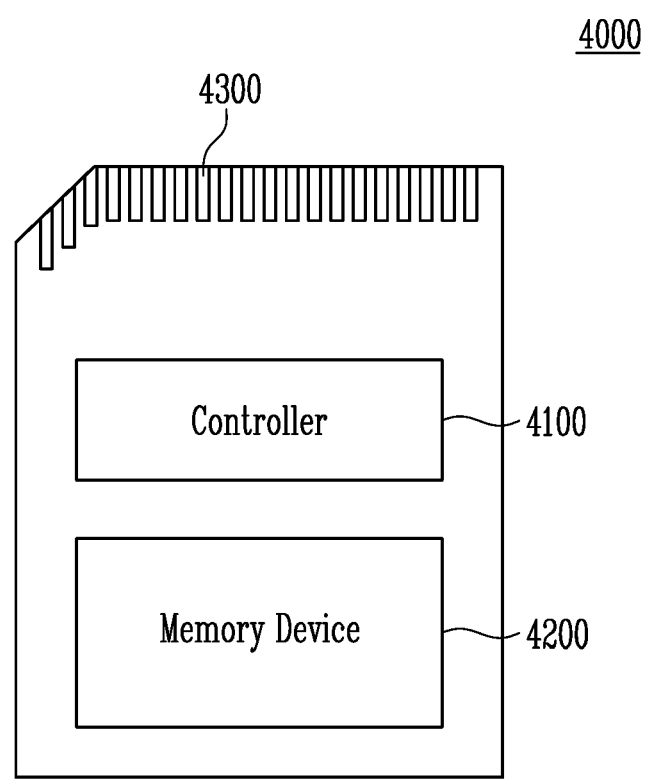
FIG. 12 is a diagram illustrating a memory card system to which a controller of the present disclosure is applied.

FIG. 12 is a diagram illustrating a memory card system 4000 to which a controller of the present disclosure is applied.

Referring to FIG. 12, the memory card system 4000 includes a controller 4100, a memory device 4200, and a connector 4300.

The controller 4100 is connected to the memory device 4200. The controller 4100 is configured to access the memory device 4200. For example, the controller 4100 may be configured to control a program, read, or erase operation of the memory device 4200 or a background operation. The controller 4100 may be configured identically to the controller 1000 shown in FIG. 1. The controller 4100 is configured to provide an interface between the memory device 4200 and a host. The controller 4100 is configured to drive firmware for controlling the memory device 4200.

For example, the controller 4100 may include components such as a random access memory (RAM), a processor, a host interface, a memory interface, and an error correction circuit.

The controller 4100 may communicate with an external device through the connector 4300. The controller 4100 may communicate with the external device (for example, the host) according to a specific communication standard. For example, the controller 4100 is configured to communicate with the external device through at least one of various communication standards such as a universal serial bus (USB), a multimedia card (MMC), an embedded MMC (eMMC), peripheral component interconnection (PCI), PCI-express (PCI-e or PCIe), advanced technology attachment (ATA), serial-ATA, parallel-ATA, a small computer system interface (SCSI), an enhanced small disk interface (ESDI), integrated drive electronics (IDE), firewire, a universal flash storage (UFS), WIFI, Bluetooth, and/or NVMe. For example, the connector 4300 may be defined by at least one of the various communication standards described above.

For example, the memory device 4200 may be configured as any of various non-volatile memory devices such as an electrically erasable and programmable ROM (EEPROM), a NAND flash memory, a NOR flash memory, a phase-change RAM (PRAM), a resistive RAM (ReRAM), ferroelectric RAM (FRAM), and/or a spin transfer torque-magnetic RAM (STT-MRAM).

The controller 4100 and the memory device 4200 may be integrated into one semiconductor device to configure a memory card, such as a PC card (personal computer memory card international association (PCMCIA)), a compact flash card (CF), a smart media (SM) card (or SMC), a memory stick, a multimedia card (MMC, RS-MMC, MMCmicro, or eMMC), a secure digital (SD) card (e.g., miniSD, microSD, or SDHC), and/or a universal flash storage (UFS).

Figure 13:
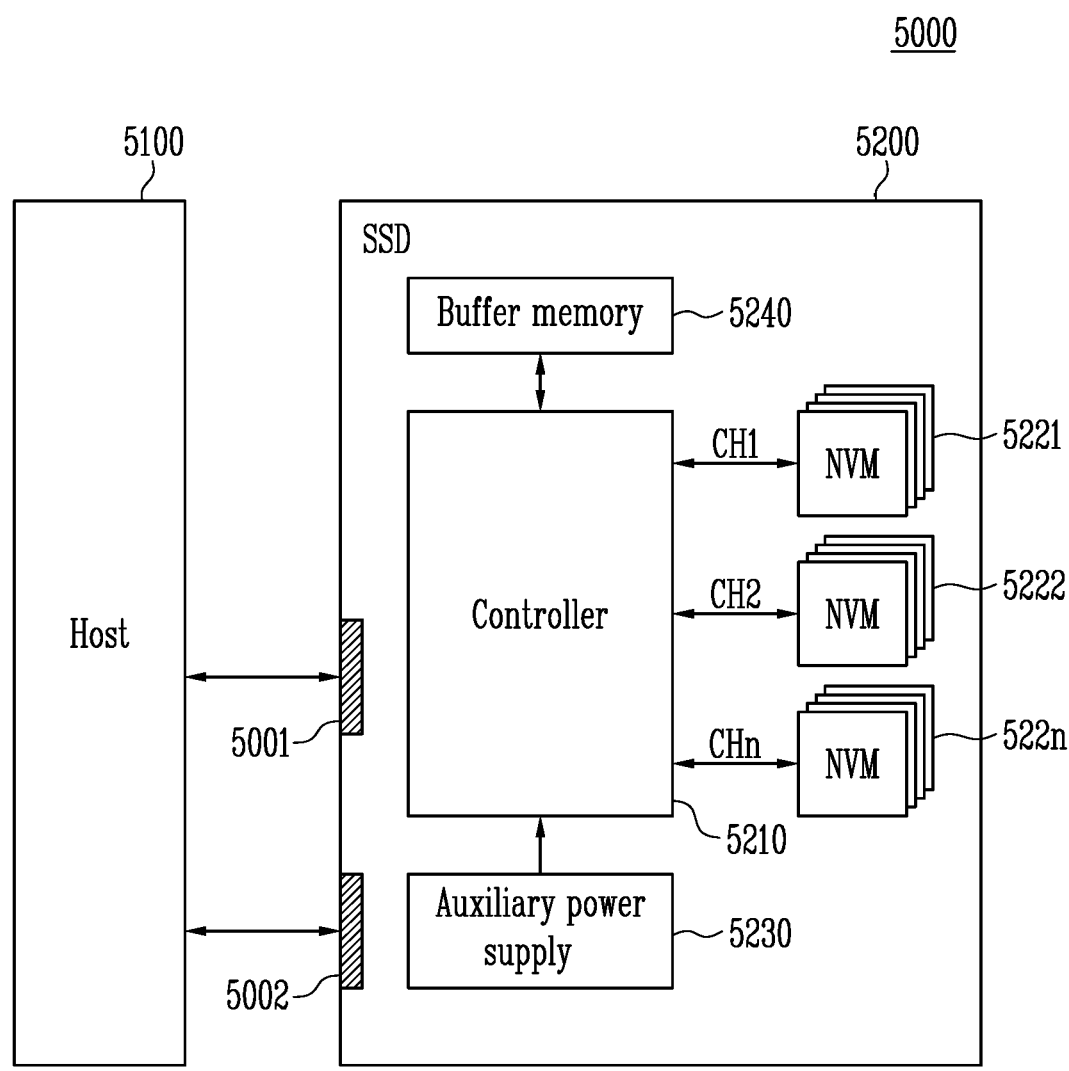
FIG. 13 is a diagram illustrating a solid state drive (SSD) system to which a controller of the present disclosure is applied.

FIG. 13 is a diagram illustrating a solid state drive (SSD) system 5000 to which a controller of the present disclosure is applied.

Referring to FIG. 13, the SSD system 5000 includes a host 5100 and an SSD 5200. The SSD 5200 exchanges a signal with the host 5100 through a signal connector 5001 and receives power PWR through a power connector 5002. The SSD 5200 includes a controller 5210, a plurality of flash memories 5221 to 522n, an auxiliary power supply 5230, and a buffer memory 5240.

According to an embodiment of the present disclosure, the controller 5210 may perform a function of the controller 1000 described with reference to FIG. 1.

The controller 5210 may control the plurality of flash memories 5221 to 522n in response to a signal received from the host 5100. For example, the signal may be signals based on an interface between the host 5100 and the SSD 5200. For example, the signal may be defined by at least one of interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), firewire, a universal flash storage (UFS), WIFI, Bluetooth, and/or an NVMe.

The auxiliary power supply 5230 is connected to the host 5100 through the power connector 5002. The auxiliary power supply 5230 may receive a power voltage from the host 5100 and charge the power voltage. When power is not smoothly supplied by the host 5100, the auxiliary power supply 5230 may provide the power voltage of the SSD 5200. For example, the auxiliary power supply 5230 may be disposed in the SSD 5200 or externally to the SSD 5200. For example, the auxiliary power supply 5230 may be disposed on a main board and may provide auxiliary power to the SSD 5200.

The buffer memory 5240 operates as a buffer memory of the SSD 5200. For example, the buffer memory 5240 may temporarily store data received from the host 5100 or data received from any of the plurality of flash memories 5221 to 522n, or may temporarily store meta data (for example, a mapping table) of the flash memories 5221 to 522n. The buffer memory 5240 may include a volatile memory such as a DRAM, an SDRAM, a DDR SDRAM, and/or an LPDDR SDRAM, and/or nonvolatile memories such as an FRAM, a ReRAM, an STT-MRAM, and/or a PRAM.

While the present invention has been illustrated and described in connection with various embodiments, those skilled in the art will recognize in light of the present disclosure that various modifications may be made to any of the disclosed embodiments with the spirit and scope of the invention. The present invention encompasses all such modifications to the extent they fall within any of the claims.

What is claimed is:

1. A controller comprising:
    a descriptor manager configured to generate descriptors including logical addresses and physical addresses respectively mapped to the logical addresses;
    a map cache configured to store the descriptors in at least one of a linear structure, a binary tree structure, and both the linear tree structure and the binary tree structure; and
    a map search engine configured to search for a descriptor corresponding to a logical address received from an external device among the descriptors stored in at least one of the linear structure, the binary tree structure, and both the linear structure and the binary tree structure based on a structure of each of the descriptors stored in the map cache,
    wherein the descriptor manager stores the descriptors in the linear structure of the map cache, then performs a calculation of a first descriptor among the descriptors for storing the first descriptor in the binary tree structure, and then transmits the first descriptor of which the calculation is finished from the linear structure to the binary tree structure.

2. The controller of claim 1, wherein the descriptor manager is configured to store the descriptors in the map cache in at least one of the linear structure, the binary tree structure, and both the linear tree structure and the binary tree structure.

3. The controller of claim 1, wherein the descriptor manager comprises:
    a descriptor generator configured to sequentially generate the descriptors including the logical addresses and the physical addresses mapped to the logical addresses; and
    a temporary queue configured to sequentially queue and output the descriptors generated by the descriptor generator.

4. The controller of claim 1, wherein the map cache comprises:
    a sub queue configured to store the descriptors in the linear structure;
    a main queue configured to store the descriptors in the binary tree structure; and
    a status buffer configured to store status information on whether the descriptors are stored in at least one of the sub queue, the main queue, and both the sub queue and the main queue.

5. The controller of claim 4, wherein each of the sub queue and the main queue includes a plurality of memory regions, and
    the first descriptor among the descriptors are is stored in a first memory region among the plurality of the memory regions.

6. The controller of claim 5, wherein the memory regions in the sub queue include one input node and one output node.

7. The controller of claim 5, wherein the memory regions in the main queue include one input node and two output nodes.

8. The controller of claim 7, wherein the descriptor manager is configured to transmit a second descriptor among the descriptors to a second memory region through one of the two output nodes after inputting the first descriptor to the first memory region.

9. The controller of claim 5, wherein the status buffer comprises:
    a first memory buffer configured to store information indicating whether any descriptor is stored in the sub queue; and
    a second memory buffer configured to store information indicating whether any descriptor is stored in the main queue.

10. The controller of claim 9, wherein, when any descriptor is stored in the sub queue, valid data is stored in the first memory buffer, and
    when any descriptor is stored in the main queue, valid data is stored in the second memory buffer.

11. The controller of claim 9, wherein, when descriptors are stored in both the sub queue and the main queue, valid data is stored in the first and second memory buffers.

12. The controller of claim 9, wherein, when any descriptor is not stored in either the sub queue or the main queue, invalid data is stored in the first and second memory buffers.

13. The controller of claim 9, wherein, according to the information stored in the first and second memory buffers, the map search engine is configured to:
    search a descriptor in the linear structure in the sub queue when it is determined that any descriptor is stored only in the sub queue,
    search a descriptor in the binary tree structure in the main queue when it is determined that any descriptor is stored only in the main queue,
    simultaneously search descriptors in the sub queue and the main queue when it is determined that any descriptors are stored in the sub queue and the main queue, and delay searching the descriptors in the descriptor manager when it is determined that any descriptor is not stored in either the sub queue or the main queue.

14. The controller of claim 13, wherein, when the descriptors are simultaneously searched in the sub queue and the main queue, the map search engine searches for a descriptor among the descriptors in the linear structure in the sub queue, and searches for a descriptor among the descriptors in the binary tree structure in the main queue.

15. A memory system comprising:

a memory device including memory blocks, each storing physical addresses; and a controller configured to communicate with the memory device using a physical address among the physical addresses and communicate with a host using a logical address corresponding to the physical address, the controller including a map cache, wherein the controller is configured to store a descriptor in a linear structure of the map cache and transmit the descriptor from the linear structure to a binary tree structure after a calculation of the descriptor for the binary tree structure is finished, and wherein the controller searches for the descriptor corresponding to the logical address in at least one the linear structure, the binary tree structure, and both the linear structure and the binary tree structure according to status information of the map cache when receiving a read request for the logical address from the host.

16. The memory system of claim 15, wherein the map cache comprises:

a sub queue configured to firstly store the descriptor in the linear structure;

a main queue configured to secondly store the descriptor in the binary tree structure; and a status buffer configured to store the status information on whether the descriptor is stored in at least one of the sub queue and the main queue.

17. The memory system of claim 15, wherein the controller comprises:

a descriptor manager configured to generate the descriptor and manage the map cache; and a map search engine configured to search for the descriptor corresponding to the logical address in at least one of the linear structure, the binary tree structure, and both the linear structure and the binary tree structure.

18. The memory system of claim 17, wherein the descriptor manager comprises:

a descriptor generator configured to generate first and second descriptors each including the logical address and the physical address mapped to the logical address; and a temporary queue configured to sequentially queue and output the first and second descriptors generated by the descriptor generator.

19. The memory system of claim 17, wherein the map search engine is configured to:

search the descriptor in the linear structure when it is determined that any descriptor is stored in the linear structure not the binary tree structure, search the descriptor in the binary tree structure when it is determined that any descriptor is stored in the binary tree structure not the linear structure, and search the descriptor in the linear structure and the binary tree structure when it is determined that descriptors are stored in the linear structure and the binary tree structure.

20. A memory system comprising:

a memory device including a plurality of memory blocks, each memory block having physical addresses; and a controller including a first queue and a second queue, configured to:

generate descriptors, each descriptor indicating a mapping relationship between a logical address and a physical address;

sequentially store the descriptors in the first queue having a linear structure;

perform a calculation for storing a selected descriptor, included in the descriptors stored in the first queue, into the second queue having a binary tree structure;

transmit the selected descriptor from the first queue to the second queue in the binary tree structure when the calculation of the selected descriptor is finished;

delaying transmitting a next descriptor stored in the first queue to the second queue until the calculation of the selected descriptor is finished;

store status information indicating whether any of the descriptors are stored in at least one of the first queue, the second queue, and both the first queue and the second queue in status buffers;

receive a target logical address from a host; and search for a descriptor associated with the target logical address in at least one of the first queue, the second queue, and both the first queue and the second queue based on a structure of each of the descriptors stored in the first queue and the second queue which is determined by the status information.

* * * * *